United States Patent [19]

Irving et al.

[11] E Re. 29,031

[45] Reissued Nov. 9, 1976

[54] CIRCUITRY FOR SORTING FRUIT ACCORDING TO COLOR

[75] Inventors: Donald W. Irving, San Jose; Charles S. Greenwood, Santa Clara, both of Calif.

[73] Assignee: FMC Corporation, San Jose, Calif.

[22] Filed: Apr. 21, 1975

[21] Appl. No.: 570,321

Related U.S. Patent Documents

Reissue of:

[64] Patent No.: 3,750,883
Issued: Aug. 7, 1973
Appl. No.: 249,974
Filed: May 3, 1972

[52] U.S. Cl. ..... 209/111.6; 356/178

[51] Int. Cl.[2] ..... B07C 5/342

[58] Field of Search ..... 209/74 R, 74 M, 111.6; 250/226; 356/178

[56] References Cited

UNITED STATES PATENTS

| | | | |
|---|---|---|---|
| 2,244,826 | 6/1941 | Cox | 209/74 M |
| 3,012,666 | 12/1961 | Cox | 356/178 X |
| 3,206,022 | 9/1965 | Roberts et al. | 209/111.6 X |
| 3,272,353 | 9/1966 | Wilder | 198/38 X |
| 3,497,304 | 2/1970 | Berube | 356/178 |
| 3,565,249 | 2/1971 | Codding | 209/74 M |
| 3,651,936 | 3/1972 | Powell | 209/74 M |
| 3,679,314 | 7/1972 | Mustert | 356/71 |
| 3,773,172 | 11/1973 | McClure et al. | 209/74 X |
| 3,781,554 | 12/1973 | Krivoshiev et al. | 209/111.6 X |
| 3,867,039 | 2/1975 | Nelson | 209/111.6 X |

*Primary Examiner*—Robert B. Reeves
*Assistant Examiner*—Joseph J. Rolla
*Attorney, Agent, or Firm*—R. S. Kelly; L. B. Guernsey; C. E. Tripp

[57] ABSTRACT

A circuit for detecting the color of a fruit on a conveyor by measuring the light reflected from the surface of the fruit at a viewing station and for providing an appropriate discharge signal so that the fruit will be discharged to a particular discharge location at a position spaced downstream from the viewing station. The circuit includes [ means ] *a light collecting device and filters* for separately measuring the amount of light reflected within two distinct bands of wavelengths of light, continuously computing the ratio of the same to derive an analog ratio signal, and comparing the ratio signal with a plurality of predetermined ratio signals in order to obtain said appropriate discharge signal. A memory circuit is included so that discharge signals for a plurality of fruit can be stored for an indeterminate period of time before any one of such fruit is directed to its discharge location.

11 Claims, 10 Drawing Figures

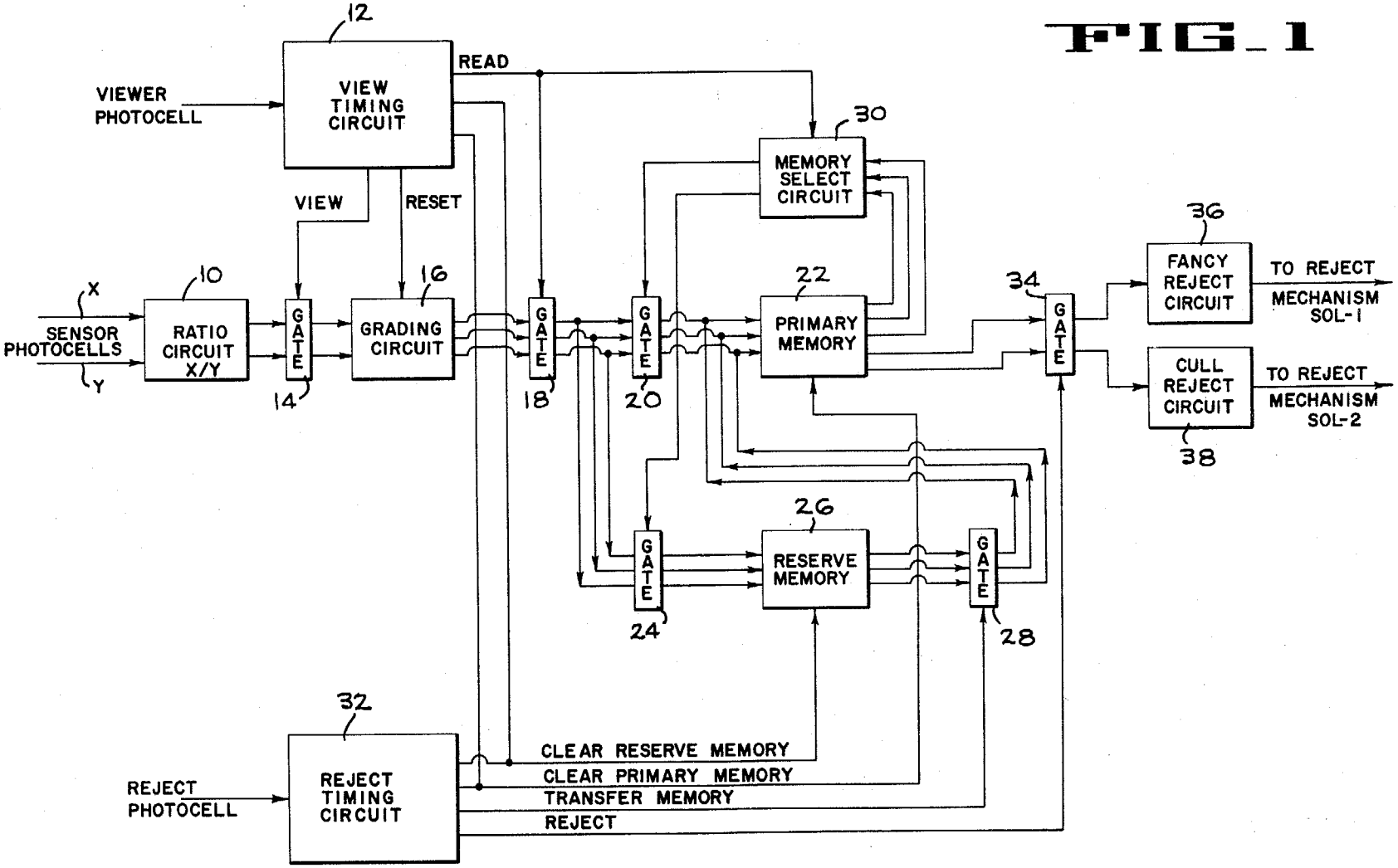
FIG. 1
TO REJECT MECHANISM SOL-1
TO REJECT MECHANISM SOL-2
FANCY REJECT CIRCUIT
36
CULL REJECT CIRCUIT
38
GATE
34
28
MEMORY SELECT CIRCUIT
30
PRIMARY MEMORY
22
RESERVE MEMORY
26
20
24
18
CLEAR RESERVE MEMORY
CLEAR PRIMARY MEMORY
TRANSFER MEMORY
REJECT
READ
RESET
VIEW
VIEW TIMING CIRCUIT
12
GRADING CIRCUIT
16
14
REJECT TIMING CIRCUIT
32
RATIO CIRCUIT X/Y
10
VIEWER PHOTOCELL
SENSOR PHOTOCELLS
X
Y
REJECT PHOTOCELL SOL-1
VIEW PHOTOCELL
VIEW
READ
RESET
CLEAR
SMALL APPLE IN VIEW
LARGE APPLE IN VIEW
3 M SEC
1.5μ SEC
40 M SEC
300 M SEC

CIRCUITRY FOR SORTING FRUIT ACCORDING TO COLOR

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention pertains to circuitry for sorting objects according to the color thereof, and more particularly, it pertains to circuitry for sorting fruit according to color by separately measuring the light reflected from the surface of a fruit within two different bands of wavelengths of light and comparing the same.

2. Description of the Prior Art

Colorimetry, i.e., the analysis of objects upon the basis of their color, has many industrial applications, particularly in the paint and dye industries, and complex and sophisticated circuits have been devised for accurately determining various shades of color. Generally speaking, attempts to apply the methods and sorting circuitry of these industries to the sorting of fruits and vegetables have been unsuccessful for a number of reasons. In matching paints and dyes, one set of measurements often suffices to establish the color of an entire batch. Even in continuous process control, changes in the color of the paints and dyes are usually gradual, and circuitry which can adjust itself rapidly to large changes in color is not required. In fruit and vegetable sorting, on the other hand, the color of each article must be separately determined, usually in a small fraction of a second, and successive determinations may lie at the extremes of the range of measurement.

The matching of paints or dyes of different composition requires a knowledge of their reflectance properties throughout the visible spectrum. A system of trichromatic coefficients is used to describe their variance in reflectance in the simplest possible terms. Logically then, the color of paints and dyes is usually measured in terms of these coefficients. Whereas this system is desirable for the comparison of different combinations of pigments, it is needlessly cumbersome for the color classification of any one fruit or vegetable. For example, it is not usually necessary to distinguish a yellow lemon from a green apple. It may, rather, be safely assumed that any one peculiarity in the reflectance properties of an apple of a given color will be characteristic of all apples of the same color. Hence, color measurements of fruit and vegetables can usually be confined to only one or two regions of the spectrum wherein such anomalies are known to occur.

Great precision is required in the matching of paints for the eye is able to distinguish small variations in color. Precise determination of the color of fruits and vegetables is seldom justified. Even if apples could readily be sorted into twenty-five color classes, it would scarcely be practical to market this number of grades. Furthermore, the variation in color over the surface of a piece of fruit is usually so great as to make a precise color measurement meaningless, and, in accordance with usual fruit color sorting practices, grading is performed upon the basis of the percentage of the "characteristic" color on the surface of the fruit.

Color sorting circuitry which has been specifically designed for the sorting of fruits and vegetables generally provides some means for measuring the reflectance properties of the fruit or vegetable being tested. The reflectance of a surface is a measurement of the percentage of incident light reflected by it, and colored objects have different reflectances for light of different wavelengths. The relationship between reflectance and the illuminating wavelength for a fruit being tested will produce a characteristic curve which can then be used in the design of apparatus and circuitry for color rating that fruit. That is to say, a fruit may be classified as to color by suitably measuring, describing, and classifying its reflectance curve, and fruit may be sorted into different grades by denoting the differences between the reflectance curves for the various grades and testing for these differences. The efficacy of such a system depends to a great extent upon the nature of the particular criterion used to describe and characterize the reflectance curves.

Several criteria of color similarity have been investigated in the past, and circuitry has been developed for their measurement. None of these circuits have proven to be wholly successful, however, in the high speed sorting of fruit and vegetables. The simplest prior art method of classifying a fruit as to color was circuitry which characterized the reflectance curve for the fruit by a single measurement of reflectance. Obviously, this measurement was made in the region of the spectrum where the change in reflectance between consecutive color grades was greatest. In color grading Washington delicious apples, for example, measurements of the reflectance would be made at a wavelength of approximately 560 nanometers wherein the variation in reflectance between the color grades is greatest. To measure this reflectance, the fruit was illuminated with a light restricted to a narrow band of wavelengths in the vicinity of 560 nanometers, or the fruit was illuminated with light of a wide band of wavelengths with an optical filter being used to receive the reflected light so as to restrict the transmitted light to a narrow band of wavelengths in the vicinity of 560 nanometers. The reflected light was directed to a photodetector, and the resulting photoelectric current was proportional to the reflectance of the fruit. The problem with such methods of making color determinations is that the measured reflectance not only varies with the color of the fruit but also varies with the intensity of illumination, the photodetector sensitivity, the fruit size, and the location and orientation of the fruit with respect to the light source and the photodetector. These latter factors usually made the reflectance measurements unreliable and led to errors in color grading.

An improvement over the aforedescribed circuits is provided by circuitry which measures the reflectance in two bands of wavelengths of light rather than in just one band. One of the selected bands will include a wavelength wherein the variation of reflectance between distinct color grades is at a maximum, and the other band will comprise wavelengths wherein there is little or no variation in reflectance between the different color grades of fruit. The determination of the color of a fruit can then be measured by observing the difference in the value of the reflectance at the two different bands of wavelengths. While such a system is more sensitive to color variations than the aforedescribed circuitry, this circuitry was still primarily dependent upon the total amount of light reflected from the surface of the fruit which total light varied due to a variety of factors and none of which were directly related to the color of the fruit.

A still further method of determining fruit color, wherein the measured value is largely independent of the total amount of light received from a fruit being inspected, has been used in certain color sorting apparatus. This method utilizes the aforedescribed method of measuring the reflectance properties of a fruit at two distinct wavelengths; however, rather than merely computing the difference between the two measurements, the ratio of these two measurements is computed so as to eliminate the errors due to variations in the total amount of light reflected because of factors other than color. While such a method is generally used in the trichromatic color measuring devices of the paint and dye industries and has been adapted in a few instances in fruit and vegetable color sorters, the circuitry which has been designed to carry out such a method has proven to be exceedingly complex and expensive and, therefore, not readily adaptable to the fruit and vegetable packing industry wherein competition with the human fruit sorter is keen. Examples of fruit sorting circuitry which utilized such a method of sorting, or variations thereof, include the circuitry shown in the prior U.S. Pat. Nos. to Powers 2,933,613, Cox 3,012,666, and Cox 2,244,826.

Another prior art color sorting apparatus is disclosed in the patent to Roberts et al 3,206,022. The circuitry disclosed in this patent utilized a ratio monitoring system wherein reflectance values at two selected wavelengths of light were measured. A predetermined percentage of one measurement was then compared with the other measurement on a "zero monitoring" system, or differential basis, whereby a series of such comparisons based upon predetermined fixed ratios established the limits of the tested reflectance ratio. This system eliminated the errors due to varying intensity in the light received from the fruit because of factors other than color (typically, the size of the fruit), although the system did not obtain a true reflectance ratio reading. While the circuitry was not as complex as the true ratio detection systems and represented a compromise between the ratio detection systems and the simpler circuitry of the prior art, it still was complex enough that it required frequent servicing and high initial cost. Furthermore, adjustments were difficult to make, and the circuitry was not readily adaptable to sorting different types or varieties of fruit. The performance of the apparatus utilizing the circuitry shown in the Roberts et al patent did not represent a sufficient increase in sorting capacity to overcome the inertia of the conservative and skeptical fruit packing industry.

*Another prior art sorting apparatus is disclosed in the patent to Mustert 3,679,314. The apparatus disclosed in this patent uses alternating light beams of different spectral intensity distribution to provide output signals which are compared by means of a divider that forms a ratio of signals. An evaluating circuit makes an acceptance decision if the ratio is within given tolerance limits. The patent does not show or suggest the circuitry necessary to form the ratio of signals or to make the acceptance decision. The apparatus shown in Mustert is used to test the genuineness of bank notes which are in a fixed position near a source of light.*

SUMMARY OF THE INVENTION

With the circuitry of the present invention a simple and effective means is provided for obtaining a true ratio signal representing the continuous ratio of the reflectances of the surface of a fruit at two distinct bands of wavelengths of light. As with the circuitry of the prior art, photodetector means are utilized for converting the reflected light into a pair of electrical signals which are indicative of the amount of light reflected by a fruit within the two different wavelength bands. These light reflection signals are then continuously electrically divided to provide an analog ratio signal which is proportional to the ratio of the light reflection signals which, in turn, corresponds to the relative amount of the "characteristic color" in the fruit. Means are provided for comparing this ratio signal with a plurality of fixed ratio signals representative of the cut points between adjacent color grades, and logic circuitry is connected with such comparing means to interrogate the various comparisons so as to obtain a discharge signal in order to direct the fruit being viewed to a particular discharge location in accordance with its determined color grade.

One of the special features of the present invention resides in the circuitry for storing the discharge signal after it has been determined and prior to the discharge of the fruit to its appropriate discharge location. This signal storing circuitry includes a memory capable of storing a plurality of discharge signals at any given time whereby a plurality of fruit may be viewed before discharge of any one of such fruit to its discharge location. Furthermore, the presence of a fruit at both the viewing station and the discharge station is detected by sensing means which operate the color determining and the discharge circuitry of the present invention so that the effective viewing and discharge of randomly spaced, irregularly sized, and irregularly conveyed fruit may be obtained.

Another special feature of the present invention is the fact that the color detecting circuitry is arranged to operate continuously during the period of time in which the fruit is conveyed past the photodetector means which latter means can be arranged to view only a small portion of the fruit at any given time. The circuitry then operates to provide a discharge signal in accordance with the peak value of the analog ratio signal whereby spot defects in the fruit can be detected and the fruit graded accordingly.

The circuitry of the present invention has a distinct advantage over the aforedescribed circuits of the prior art in that it is simple and includes relatively few expensive components thereby making it adaptable for use in the fruit packing industries wherein cost is a most important factor. Furthermore, the circuitry provides a true continuous ratio reading of the reflectance values at the two selected bands of wavelengths of light. Thus, the apparatus can be readily adjusted for handling different types and grades of fruit, and the test procedures utilized in setting up the apparatus are simplified since the true relationship of any particular fruit to the color standards can be accurately and readily determined.

BRIEF DESCRIPTION OF THE DRAWINGS

FIG. 1 is a block diagram representation of the circuitry of the present invention.

DESCRIPTION OF THE PREFERRED EMBODIMENT

Figure 2:
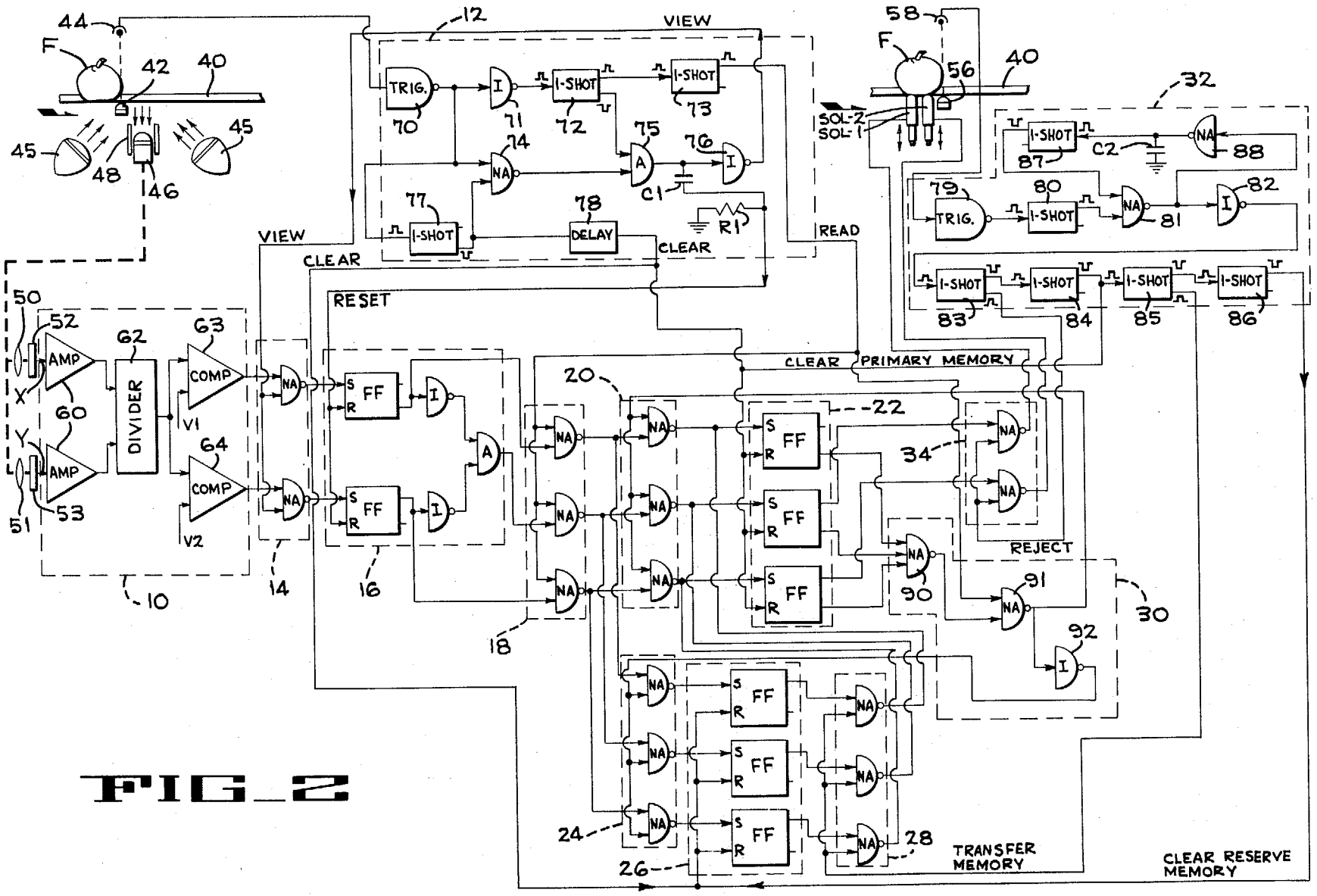
FIG. 2 is a schematic diagram of the circuitry and the main functional apparatus components of the present invention showing in greater detail than FIG. 1 the various circuit elements.

As pointed out hereinbefore, the circuitry of the present invention is adapted to be utilized in connection with color sorting apparatus wherein individual fruit are conveyed past a viewing head. At the viewing head the fruit is illuminated and the light reflected from the surface of the fruit is received and split into two equal portions which are each passed through an optical filtering means to restrict the wavelengths of light transmitted. The light from the filters is directed to a pair of photodetector means where it is converted into a pair of electrical signals. The signal from each photodetector, the amplitude of which is proportional to the intensity of the light reflected in that band of wavelengths of light passing through the associated filter, is then processed with the circuitry of the present invention to accurately determine the color grade to which the fruit belongs and also provide a discharge signal which is stored until the fruit reaches a discharge location where a reject signal activates the proper mechanism to discharge the fruit from its supporting conveyor.

The aforedescribed apparatus, as broadly specified, has been utilized previously in the color sorting of fruit, and such prior art devices may be utilized with the circuitry of the present invention. However, a preferred form of fruit color sorting apparatus, which is particularly adapted to be utilized with the circuitry of the present invention, is disclosed in the U.S. Pat. application [ of Charles S. Greenwood et al, Attorney's docket SJ 6025, filed on even date herewith. ] *Ser. No. 249,925, now U.S. Pat. No. 3,770,111.* Reference to this patent [ application ] may be had for a further and more complete description of the optical and mechanical details of the fruit color sorting apparatus.

While the circuitry of the present invention may be utilized in sorting fruit or vegetables of any type, such circuitry is particularly adaptable to the sorting of apples which pose some special problems for automatic sorting apparatus. Consequently, the following description will be directed specifically toward circuitry for sorting Washington Delicious apples although it will be understood that the identical circuitry might be used to sort other types of fruit and vegetables with but minor adjustments to the optical filter means and to the ratio measuring circuitry in order to vary the sorting grades in accordance with the characteristic color of the particular fruit or vegetable being viewed.

A particular fruit variety will have a characteristic pattern of wavelengths associated with its surface color, and the selection of the optical filter means is made so that an increase in the ratio of the electrical input signals corresponds directly to an increase in the amount of characteristic color in the fruit being viewed. In the present case, with Washington Delicious apples, downgrading (and hence sorting) occurs when an increase in green relative to the desired red color is detected on the apple surface. The circuitry of the present invention is thereby adjusted so as to measure the increase in the green-red ratio, and, since the circuitry is set to detect the peak value of the ratio between the light reflection input signals, the circuitry comprises a "peak green" detection system.

Figure 4:
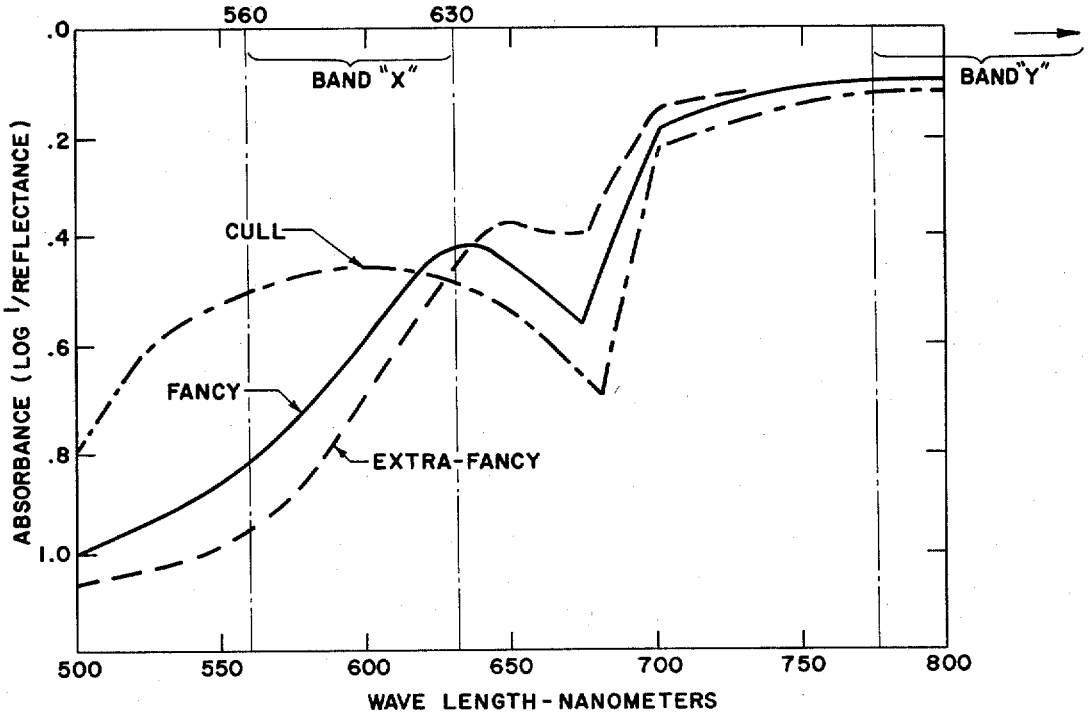
FIG. 4 is a graph showing as ordinate, absorbance, and as abscissa, wavelength in nanometers. Three reflectance curves are shown indicative of the representative reflectance, or absorbance, values for three typical color grades of apples.

FIG. 4 shows the characteristic absorbance curves for three commercial color grades of Washington Delicious apples with such curves being shown within a portion of the visible spectrum of approximately 500 to 750 nanometers. Reflectance, which is measured as a percentage of the incident light reflected from the surface of an object, is computed by measuring the intensity of the output of the photodetectors which receive the reflected light. The absorbance is the logarithm of the inverse of the reflectance. For example, an absorbance of unity indicates a reflectance of 10 per cent while an absorbance of zero indicates a reflectance of 100 per cent. From FIG. 4 it will be apparent that the maximum spread between the three absorbance, or reflectance, curves exists between 500 nanometers and 630 nanometers with the greatest degree of divergence occurring in the green light range at about 550 nanometers. Also, it will be noted that the curves converge in the infra red range at the upper end of the visible spectrum above 750 nanometers.

As pointed out previously, the present invention utilizes the prior art method of measuring the reflected light from the surface of the fruit within two distinct bands of wavelengths. However, rather than attempting to measure reflected light within narrow wave bands, the present invention utilizes as wide a wave band as possible for each input signal so as to increase the amount of reflected light received by the photodetector means in order to make the circuitry as insensitive as possible to noise and other variations in signal strength not due to changes in color of the fruit being viewed. Accordingly, the lower band (Band X) is selected with a lower limit of 560 nanometers and an upper limit of 630 nanometers in order to eliminate the false readings which would occur due to the crossover of the curves in the red area. The upper band (Band Y) is selected in the infra red spectrum with a lower limit of about 780 nanometers and with the upper limit limited only by the ability of the photodetectors to convert the higher wavelengths to electrical energy. It will be appreciated, therefore, that the highest grade, or "extra-fancy", apples will show the lowest ratio between the light reflectance signals, the next highest grade, or "fancy", apples will show the next lowest ratio, and the lowest grade, or "cull", apples will show the highest ratio.

The circuitry of the present invention is shown schematically in the block diagram illustration of FIG. 1. A pair of electrical signals X and Y are received from the sensor photocells, or photodetector means, which measure the intensity of the reflected light from the surface of the fruit within the aforedescribed two distinct bands X and Y. These signals are then directed to a ratio circuit 10 which performs a continuous electrical division in order to obtain the analog ratio signal. This signal, by means to be described in more particularity hereinafter, is compared with a plurality of predetermined fixed ratio signals, and the information from these comparisons is directed through a gate 14 to a grading circuit 16. The grading circuit includes logic circuitry to establish the color grade of the apple with the information received from the ratio circuit and to provide an appropriate discharge signal. The discharge signal is then passed through a gate 18 and a gate 20 to a primary memory circuit 22. However, if it is established that the primary memory circuit already contains a discharge signal from a previously graded (but not discharged) apple, then the discharge signal is transferred through a secondary gate 24 to a reserve memory circuit 26. A memory select circuit 30 is utilized to interrogate the primary memory circuit each time that a new signal is presented to the gate 20. This memory select circuit operates to direct the signal either through the gate 20 to the primary memory circuit (if the primary memory circuit is unoccupied) or to direct it through the gate 24 to the reserve memory circuit. Each time that a discharge signal is transferred out of the primary memory circuit a gate 28 is activated to transfer any signal in the reserve memory circuit into the primary memory circuit. Transfer of the signal out of the primary memory circuit is through a gate 34 to a reject circuit 36 for fancy apples or to a reject circuit 38 for cull apples. A reject circuit for the extra-fancy apples could also be provided, but with the apparatus of the present invention it is desired that these apples remain on their transport conveyor, and therefore no special reject, or discharging, means is provided for this highest grade of apples.

A view timing circuit 12 also forms a portion of the circuitry of the present invention and operates in conjunction with a fruit position sensing means at the viewing station. This circuit 12 produces a "view" signal to activate the gate 14 and transfer information from the ratio circuit to the grading circuit and also produces a "read" signal to activate the memory select circuit 30 and the gate 18 to transfer the fruit discharge signal either to the primary memory circuit 22 or to the reserve memory circuit 26. A further function of the view timing circuit 12 is to reset the grading circuit and to clear the reserve memory and the primary memory circuits during periods when no fruit are being sorted.

A reject timing circuit 32 also forms a portion of the circuitry of the present invention and operates in conjunction with a fruit position sensing means at the discharge station. This circuit activates the gate 34 to cause the reject circuits 36 and 38 to become active and also activates gate 28 so that signals will be transferred from the reserve memory circuit 26 to the primary memory circuit 22 after each fruit discharge. The reject timing circuit also functions to clear the reserve memory circuit and the primary memory circuit after each fruit discharging operation.

A more complete depiction of the circuitry of the present invention and the associated sorting apparatus is presented diagrammatically in FIG. 2. A fruit F is adapted to be carried in a horizontal direction by a conveyor 40. At a viewing station, shown in the upper left hand corner of FIG. 2, the fruit is detected by the first position sensing means as the leading edge of the fruit breaks the light beam between a light source 42 and a photocell 44. This activates the view timing circuit 12. As the apple moves downstream of the position sensing means, light from a plurality of light sources 45 is reflected from the surface of the fruit and is directed through a narrow channel 48 to light collecting means 46 which splits the reflected light into two equal portions and directs it through a pair of optical filters 50 and 51 to photodetector means 52 and 53 the outputs of which provide the electrical signals X and Y respectively. The optical filters 50 and 51 are provided to restrict the light which the associated photodetector receives to those wavelengths previously described. Obviously, if the apparatus is designed to color grade fruit other than Washington Delicious apples, the filters 50 and 51 may be changed in order to vary the nature of the characteristic color detected by the circuitry of the present invention.

Once a color determination has been made by the circuitry of the present invention, the appropriate discharge signal is held in the primary memory circuit 22 until the apple reaches the discharge station, shown in the upper right hand corner of FIG. 2. At the discharge station the leading edge of the apple will be sensed by the beam between a light source 56 and a photocell 58 to activate the reject timing circuit 32. When this circuit is activated one of three fruit discharging operations will occur. Either (1) a solenoid SOL-1 will be activated to discharge the apple off of one side of the conveyor (in the case where the apple is graded "fancy"), (2) a solenoid SOL-2 will be actuated to discharge the apple off of the opposite side of the conveyor (in the case where the apple is graded as a "cull"), or (3) neither solenoid will be actuated thereby allowing the fruit to pass downstream on the conveyor 40 (in the case where the apple is graded "extra-fancy"). Obviously, other forms of fruit discharging apparatus could be utilized with the circuitry of the present invention if desired.

In considering the operation of the circuitry shown in FIG. 2, it will be understood that those elements designated with the numerals "FF" are set-reset flip-flop circuits wherein a low or "0" signal applied to the upper, or S, input will cause the lower output to go to 0 and the upper output to go high, or "+". This state will remain until a reset signal is applied to the lower, or R, input which will cause the upper output to go to 0 and the lower output to go to a + condition. Conventional AND gates have been identified with the letter "A", conventional NAND gates have been designated with the letters "NA", and conventional inverters have been identified with the letter "I".

Figure 3:
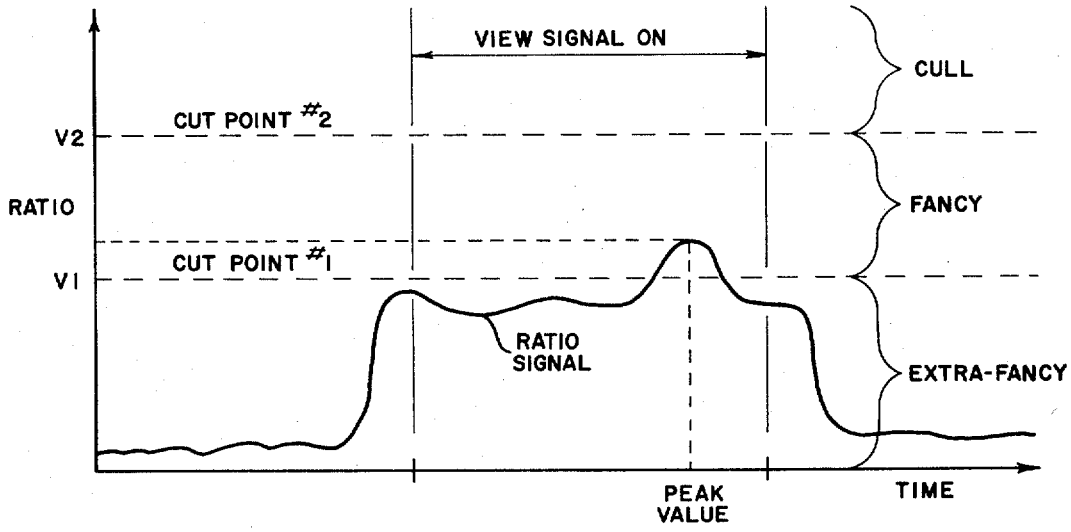
FIG. 3 is a graph showing as ordinate, the ratio signal in volts, and as abscissa, time. A curve is shown which illustrates a typical ratio signal received from a test apple being viewed, and the various predetermined fixed ratio signals are indicated so that the color grade of the test apple can be readily ascertained.

The ratio circuit 10 comprises one of the main functional components of the circuitry of the present invention and will be seen to include a matched pair of amplifiers 60 for amplifying the light reflection signals X and Y. The amplified signals are then transferred to a divide network 62 which performs a continuous electrical division upon the two input signals so that the output thereof is proportional to a dimensionless quantity representing the ratio of the input signals. In the present case the reflectance in the visible band X is divided by the reflectance in the infra red band Y so that the lowest obtained ratio signals will be those of the "extra-fancy" apples while the highest obtained ratio signals will be those of the "cull" apples (see FIG. 4). A preferred circuit for producing a continuous electrical division process upon the low level input signals (0–10 volts) is a differential input divider network, Model No. 4094/15C, manufactured by Burr-Brown Research Corporation of Tuscon, Arizona. The voltage output of this divide circuit 62 is then separately applied to a pair of differential comparators 63 and 64. Comparator 63 is provided with an additional voltage input V1, and comparator 64 is provided with an additional voltage input V2. The comparators comprise differential amplifiers wherein an output will be present if and only if the input from the divide network 62 exceeds the other input V1 or V2. Referring to FIG. 3, it will be noted that the ratio signal from the divide network 62 will rise to some continuously varying level as the fruit is viewed and will remain there throughout the time that the fruit is inspected. The lower voltage V1, which is applied to the comparator 63, defines the cut point between the "extra-fancy" grade and the "fancy" grade. If the ratio signal during any time which the fruit is being inspected exceeds this voltage, a signal will be transmitted from comparator 63. Likewise, if the ratio signal at any time during the viewing of the fruit exceeds the higher voltage V2, a signal will be transmitted from comparator 64 indicating that the apple is a "cull." The apple, whose ratio signal is indicated in FIG. 3, will be seen to be graded "fancy" since its peak ratio signal exceeds the first cut point voltage V1 but does not exceed the second cut point voltage V2.

Prior to the activation of the ratio circuit 10, the view timing circuit 12 will be activated as the fruit F breaks the beam to the photocell 44. This will cause a pulse to be created by a Schmidt triggering circuit 70 which pulse is applied to the gate of an inverter 71, to one of the inputs of a NAND gate 74, and to the input of a monostable multivibrator, or one-shot circuit, 77 which provides a negative output pulse of 40 milliseconds. At the end of the 40 millisecond delay period, both inputs to gate 74 will be + so that the output thereof will go to 0 which will cause the output of AND gate 75 to go to 0. With a negative pulse out of AND gate 75, a sharp reset pulse is provided by the resistor-capacitor circuitry R1-C1 and applied to reset a pair of flip-flops in the grading circuit 16 so that they will be ready to receive new grading information. Also, inverter 76 inverts the negative pulse from gate 75 to obtain the "view" signal which is applied to the gating circuit 14 so as to permit the transfer of signals from the comparators 63 and 64 into the grading circuit.

After the fruit has passed the position sensing beam to the photocell 44 at the viewing station, the output from the trigger circuit 70 will cease to activate the one-shot circuit 72 which provides a 3 millisecond positive pulse to a one-shot circuit 73 and a 3 millisecond negative pulse to the AND gate 75. The negative pulse to AND gate 75 maintains the "view" signal on for three milliseconds after the apple has passed the position sensing beam in order to permit the trailing portion of the apple to be viewed. Also, the negative pulse from one-shot 72 will activate the "view" signal (for a 3 msec. period) if a small apple passes through the detection beam in less than 40 msec. Since the fruit may translate on the conveyor 40 and therefore not be moved at a uniform speed, the viewing operation is strictly controlled by the position photocell 44 in the manner indicated. The one-shot 73 has a short 1.5 microsecond pulse output which provides the "read" signal to trigger the gate 18 which passes the discharge signal information from the grading circuit to the memory circuits 22 or 26. The view timing circuit also includes a delay circuit 78 which, when activated by a positive pulse from the deactivation of the one-shot 77, will provide a clearing signal after a 300 millisecond delay time (provided no new apple has been sensed by photocell 44 in the meantime) to clear the registers in both memory circuits and to keep them clear until an apple again breaks the beam to photocell 44. This delay time is long enough to allow any apple to clear the discharge station after it has been viewed, and the clearing signal is provided for the purpose of preventing misinformation from remaining in the memory circuits to create possible errors in the discharging of all subsequent apples.

As shown in FIG. 2, the grading circuit 16 comprises a pair of set-reset flip-flops, a pair of inverters and an AND gate which components are arranged so that only one of the three output lines will have a signal thereon. The output signal will depend upon the input information from the comparators 63 and 64. If an "extra-fancy" apple is being graded, both inputs to the grading circuit will be at a high logic level, or +, and the uppermost output line will be + with the other two outputs being at a 0 logic level. If a "fancy" apple is being graded, the input from comparator 64 will be + while the input from comparator 63 will be 0 which will result in the middle output line being + with the other two outputs being 0. Finally, if a "cull" is being graded, the two inputs to the grading circuit will be 0 and the lowermost output will be +.

Upon the application of the "read" signal from the one-shot circuit 73, the gate 18 is activated to transfer the determined discharge signal to a second gate 20. The memory select circuit 30 determines whether the signal will then be transferred through the gate 20 the primary memory 22 or through the gate 24 to the reserve memory 28. This memory select circuit includes a NAND gate 90 having three inputs connected to the flip-flops in the primary memory all of which inputs will be + so long as none of the flip-flops have been set by the transmission of grading information thereto. If all three inputs to NAND gate 90 are + the output will be 0 which condition will maintain the output of NAND gate 91 high so as to cause the discharge signal to be transferred through the gate 20 into the primary memory. However, if the output of NAND gate 90 is +, due to information being present in the primary memory, the output of NAND gate 91 will go to 0 upon the application of the "read" signal and a pulse is passed through an inverter 92 and applied to the gate 24 so that information is transferred to the reserve memory rather than the primary memory. Thus, if a discharge signal is read for a second fruit before the preceding fruit has been discharged, the second signal will be transferred to the reserve memory 28 where it will remain until the discharge of the first fruit.

The reject timing circuit, which is shown at the right hand side of FIG. 2, includes a Schmidt triggering circuit 79 which is activated when the beam to the position sensing photocell 58 is broken. This activates a 15 millisecond one-shot circuit 80 which applies a positive pulse into NAND gate 81 to make the output thereof go to 0 which is inverted by inverter 82 and applied to a one-shot circuit 83. After a 1.5 microsecond delay, the one-shot 83 will apply a positive pulse to one-shot 84 which, after another 1.5 microsecond delay, will apply a positive pulse to the one-shot 85 which, after a further 1.5 microsecond delay, will apply a positive pulse to the one-shot 86. The latter one-shot circuit applies a 1.5 microsecond pulse to reset the reserve memory 26. One-shot 85 applies a 1.5 microsecond positive pulse to activate gate 28 to transfer information from the reserve memory to the primary memory. One-shot 84 provides a pulse to reset or clear the primary memory while one-shot 83 provides a 1.5 microsecond positive pulse to activate gate 34 and transfer information out of the primary memory to the selected solenoid SOL-1 or SOL-2 to eject the fruit F to the appropriate discharge location. The reject timing circuit thereby provides a sequenced operation which begins when a fruit interrupts the beam to photocell 58. Immediately thereafter a pulse is transferred to gate 34 to initiate the appropriate discharge of the fruit. After 1.5 microseconds, the primary memory is reset, i.e., cleared of any information. After another 1.5 microseconds the information in the reserve memory, if any, is transferred to the primary memory. Finally, after another 1.5 microseconds, the reserve memory is reset.

The reject timing circuit also includes a NAND gate 88, a capacitor C2, and a one-shot circuit 87 which are connected between the output of NAND gate 81 and the input thereof. This circuit provides a means to lock out the reject circuit after the apple interrupts the beam at the discharge station so that any belt deflections caused by the reject pulse and the discharge of the apple will not be able to retrigger the circuit. The capacitor C2 causes a delay in the transfer of the pulse from the NAND gate 88 to the one-shot 81 so that the successive one-shots 83, 84, 85 and 86 will be activated before the circuit is locked out. The one-shot circuit 87 provides a pulse for a sufficient length of time, about 40 milliseconds, so that no further signal from photocell 58 will be able to retrigger the circuit until after the fruit at the station has been discharged.

Figures 5, 6, 7, 8, 9, 10:
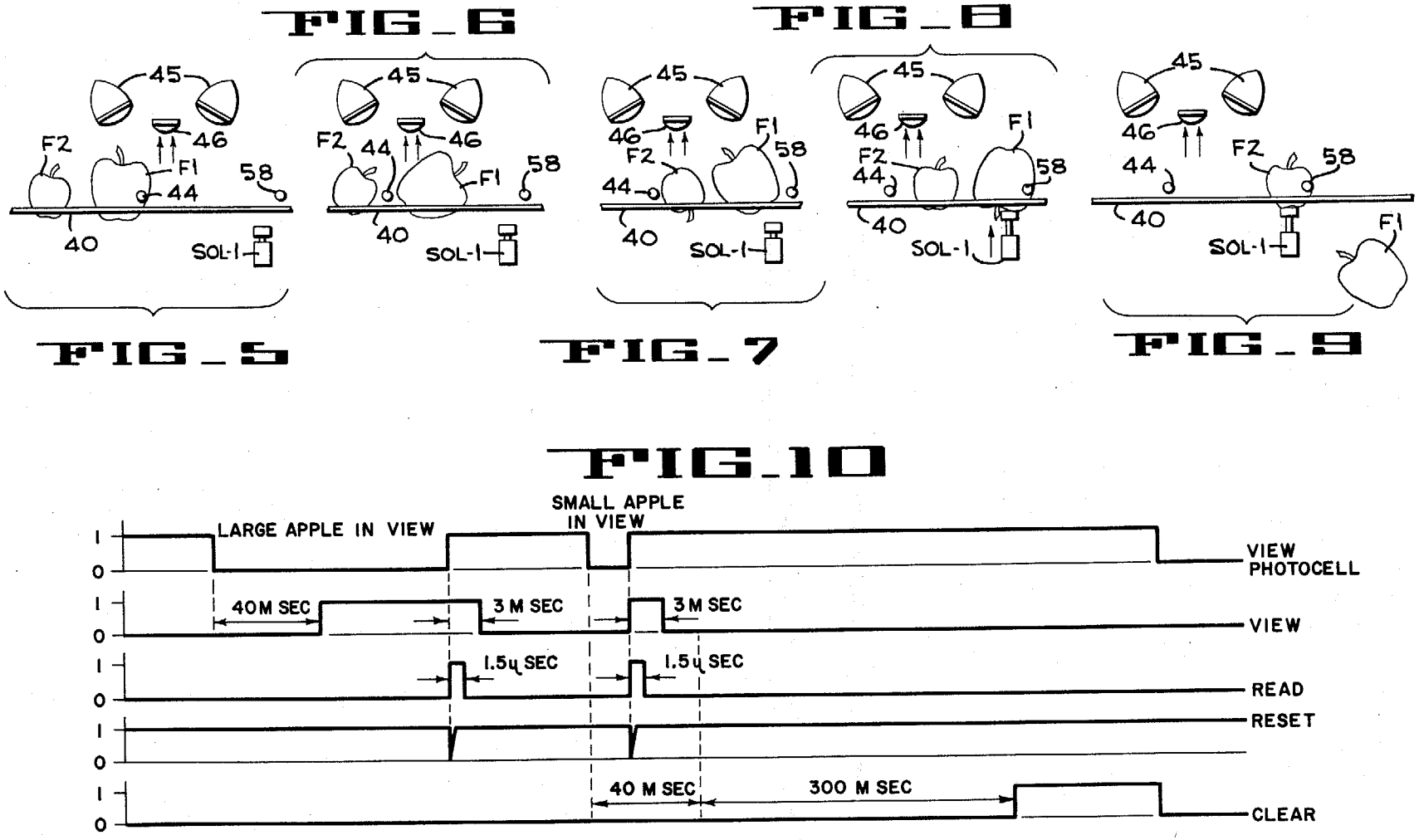
FIGS. 5 through 9 are diagrammatic operational views of an apparatus adapted to utilize the circuitry of the present invention, such Figures sequentially illustrating the color grading operation upon a pair of apples which are successively graded and discharged from their transport conveyor.
FIG. 10 is a chart which diagrammatically illustrates the logic level conditions of the circuitry of the present invention during grading and discharging operations as disclosed in FIGS. 5–9.

Considering the aforedescribed circuitry, the diagrams of FIGS. 5–9, and the chart of FIG. 10, a brief resume of the operation of the circuitry will now be given. As shown in FIG. 5, two apples are moving along the conveyor 40 — a leading apple F1 of large size and a trailing apple F2 of small size. Both the primary memory and the reserve memory will be clear at this time. When the leading apple F1 breaks the beam to the photocell 44 nothing happens for 40 milliseconds. After that time, the "view" signal will be activated so that information will begin to be transferred from the ratio circuit 10 through gate 14 to the grading circuit 16. The 40 millisecond delay is to permit travel of the fruit from the photocell 44 to the viewing light 46 and to allow for possible translating movement of the fruit rearwardly upon the conveyor. As the fruit F1 passes the light collecting means 46, the grading circuit will continue to operate until the trailing edge of the fruit passes the photocell 44 (FIG. 6). At that time the "read" signal pulse of 1.5 microseconds is actuated to transfer information from the grading circuit into the primary memory. After 3 milliseconds, the view signal stops. Also, a reset pulse is provided to reset the grading circuit for the next apple.

As shown in FIG. 7, a small apple F2 may pass through the viewing station before the preceding large apple F1 has been discharged. This small apple may pass the photocell 44 in a period of time of less than the 40 milliseconds. When this happens, the "view" signal will be turned on when the trailing edge of the apple clears the photocell 44 which at the same time also activates the "read" and "reset" signals. The discharge signal for small apple F2 will be stored in the reserve memory since the discharge signal for apple F1 is already stored in the primary memory.

As shown in FIG. 8, the leading apple F1 arrives at the discharge station and breaks the beam to the photocell 58. This apple is ejected from the conveyor in accordance with its grade as stored in the primary memory and the primary memory is cleared. The discharge signal for apple F2 is then shifted from the reserve memory to the primary memory and the reserve memory is cleared. As shown in FIG. 9, the small apple F2 arrives at the discharge station breaking the beam to photocell 58 and is rejected according to its grade which information is now stored in the primary memory. The primary memory is then cleared. After 340 milliseconds from the time that the leading edge of the apple F2 was detected by photocell 44, the clear signal from delay circuit 78 is provided to clear both of the memory circuits and eliminate any accumulated errors util a new fruit moves across the beam to photocell 44 to reinitiate the foregoing procedure.

From the foregoing description it can be seen that the circuitry of the present invention provides a simplified scheme for readily obtaining a continuous signal measuring the dimensionless ratio between the light reflected from the surface of a fruit within two distinct bands of wavelengths of light. The circuitry can be adapted to be used with almost any type of conventional conveying and discharge mechanisms, and special sensing circuitry has been integrated with the color determining circuitry so that an indeterminate period of time may be allowed between the time that a fruit is sensed at the viewing station and the time that it is in position to be discharged at the discharge station whereby the sorting apparatus can be simplified in its construction to permit fruit to be randomly conveyed at non-uniform speeds.

Although the best mode contemplated for carrying out the present invention has been herein shown and described, it will be apparent that modification and variation may be made without departing from what is regarded to be the subject matter of the invention.

What is claimed is:

1. In an apparatus for sorting fruit according to the color thereof, circuitry comprising detection means for producing a pair of continuous light reflection signals indicative of the amount of light reflected by a fruit within two different bands of wavelengths of light, means for continuously electrically dividing said signals to provide an analog ratio signal which is proportional to the ratio of said light reflection signals, a plurality of comparators each of which is arranged to simultaneously compare said ratio signal with a predetermined fixed ratio signal, and means operatively connected to each of said comparators for providing a discharge signal representative of a decision to direct said fruit to a particular discharge location.

2. In an apparatus for sorting fruit as set forth in claim 1, means for storing said discharge signal until such time as said fruit is in position to be directed to said particular discharge location, and means responsive to said last named means for providing a signal to operate a discharge mechanism when said fruit is in a position to be directed to said discharge location.

3. In an apparatus for sorting fruit as set forth in claim 2 wherein said means for storing said discharge signal comprises a primary memory means and a reserve memory means, means operative to normally transfer said discharge signal to said primary memory means but being operative to transfer a discharge signal to said reserve memory means if a signal is already present in said primary memory means, and means operative to transfer any discharge signal in said reserve memory means to said primary memory means each time that a fruit is moved to its discharge location whereby two fruit may be analyzed by said detection means before the discharge of either fruit to its discharge location.

4. In an apparatus for sorting fruit as set forth in claim 1 wherein said bands of wavelengths of light are distinct with no overlapping thereof.

5. In an apparatus for sorting fruit as set forth in claim 4 wherein one of said bands is comprised of wavelengths of light of greater than about 750 nanometers and wherein the other of said bands is comprised of wavelengths of light of between about 560 nanometers and about 630 nanometers.

6. In an apparatus for sorting fruit as set forth in claim 1 wherein each of said comparators is arranged to provide an output signal if said analog ratio signal is greater than the fixed ratio signal associated with said comparator, and a logic circuit for simultaneously analyzing the output signals of each of said comparators in order to provide said discharge signal.

7. In an apparatus for sorting fruit as set forth in claim 6 including gating means connected between each of said comparators and said logic circuit, and means for sensing the presence of said fruit at a location wherein said detection means will receive the reflected light from said fruit, said sensing means being operative to open and close said gating means to permit signals to be passed to said logic circuit only when a fruit is in position to reflect light to said detection means.

8. In an apparatus for sorting fruit according to the color thereof, circuitry comprising detection means for producing a pair of continuous light reflection signals indicative of the amount of light reflected by a fruit within two different bands of wavelengths of light, means for continuously electrically dividing said signals to provide an analog ratio signal which is proportional to the ratio of said light reflection signals, means for comparing said ratio signal with a plurality of signals each of which are equal to a different predetermined fixed ratio signal, means operatively connected to said comparing means for providing a discharge signal representative of a decision to direct said fruit to a particular discharge location, and means for rendering said means for providing a discharge signal operative during the period of time which is required for said fruit to be conveyed past said detection means, said means for providing a discharge signal being arranged to provide said discharge signal in accordance with the peak value of said analog ratio signal during the time that said fruit is conveyed past said detection means.

9. In an apparatus for sorting fruit as set forth in claim 8 wherein said comparing means comprises a plurality of comparators each of which provide an output only if the analog ratio signal which is applied to the input thereof is greater than the predetermined fixed ratio signal applied to the input of the comparator.

10. In an apparatus for sorting fruit according to claim 9 wherein said means for providing a discharge signal includes a plurality of bistable elements each of which are connected to the output of one of said comparators, each of said bistable elements being arranged to change state upon the reception of an output signal from its associated comparator.

11. In an apparatus for sorting fruit according to claim 10 wherein each of said bistable elements comprises a flip-flop circuit, and a logic circuit connected to the outputs of said flip-flop circuits for simultaneously analyzing said outputs of said flip-flop circuits in order to provide said discharge signal.

[12. In an apparatus for sorting fruit according to the color thereof, circuitry comprising first fruit sensing means for detecting the presence of a fruit at a viewing station, means for receiving the light reflected from said fruit and for providing a discharge signal in accordanc with the color of said fruit and representative of a decision to direct said fruit to a particular discharge location, said means for providing said discharge signal being activated by said first sensing means, second sensing means for detecting the presence of said fruit at a discharge station which is spaced downstream in the direction of movement of said fruit from said viewing station, discharge circuit means operatively connected to receive said discharge signal when activated by said second sensing means so as to cause said fruit to be directed to the correct discharge location in accordance with the color thereof, and means for storing said discharge signal for an indeterminate period of time prior to activation of said discharge circuit means, said signal storing means having a capacity to store a plurality of discharge signals at any given time whereby a plurality of fruit may be viewed before discharge of any one of such fruit to its discharge location.]

[13. In an apparatus for sorting fruit as set forth in claim 12 wherein said means for storing said discharge signal comprises a primary memory means and a reserve memory means, means operative to normally tranfer said discharge signal to said primary memory means but being operative to transfer a discharge signal to said reserve memory means if a signal is already present in said primary memory means, and means operative to transfer any discharge signal in said reserve memory means to said primary memory means each time a fruit is moved to its discharge location.]

[14. In an apparatus for sorting fruit as set forth in claim 12 including means operatively connected to said first sensing means for causing the transfer of a discharge signal into said signed storing means when the period of detection of a fruit by said first fruit sensing means ceases.]

* * * * *